Jan. 13, 1925. 1,523,368

J. REICHERT

ANTISKID DEVICE FOR VEHICLE WHEELS

Filed Nov. 17, 1919    2 Sheets-Sheet 1

Inventor.
John Reichert.
by
his Atty.

Jan. 13, 1925.　　　　　　　　　　　　　　　　1,523,368
J. REICHERT
ANTISKID DEVICE FOR VEHICLE WHEELS
Filed Nov. 17, 1919　　2 Sheets-Sheet 2
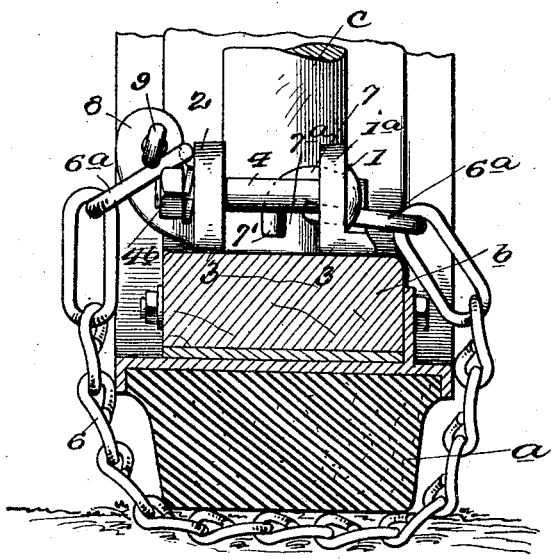
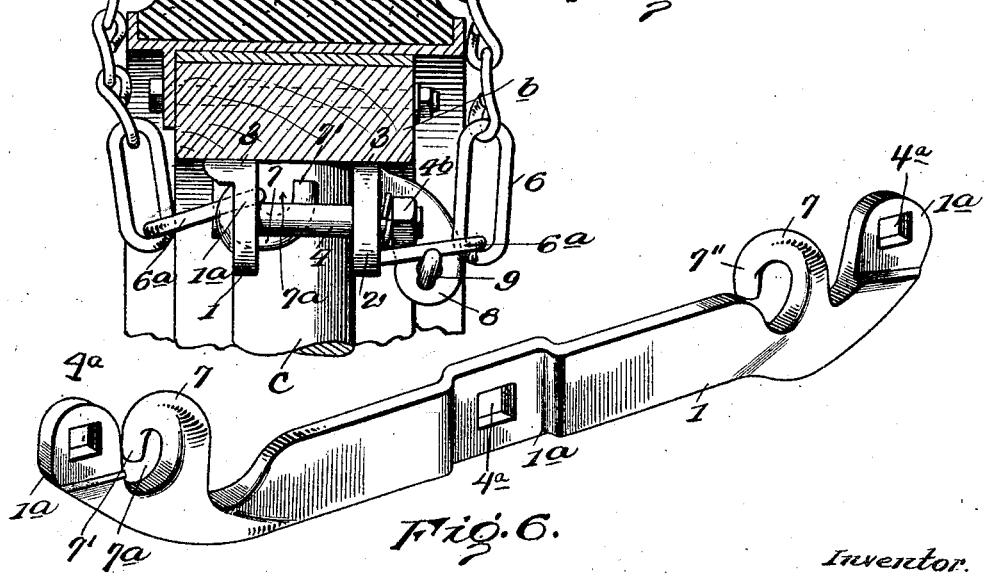
Inventor.
John Reichert.
by Hubert E. Peck
his Atty.

Patented Jan. 13, 1925.

1,523,368

UNITED STATES PATENT OFFICE.

JOHN REICHERT, OF RACINE, WISCONSIN.

ANTISKID DEVICE FOR VEHICLE WHEELS.

Application filed November 17, 1919. Serial No. 338,490.

*To all whom it may concern:*

Be it known that I, JOHN REICHERT, a citizen of the United States of America, and resident of Racine, Racine County, State of Wisconsin, have invented certain new and useful Improvements in and Relating to Antiskid Devices for Vehicle Wheels, of which the following is a specification.

This invention relates to certain improvements in anti-skid devices for vehicle wheels; and the objects and nature of the invention will be readily understood by those skilled in the art in the light of the following explanation of the accompanying drawings illustrating what I now believe to be the preferred mechanical expression or embodiment of the invention from among other forms, constructions and arrangements within the spirit and scope thereof.

An object of the invention is to provide certain improvements in so-called truck chains of the type embodying a pair of clamping bars providing means for the attachment of two anti-skid or traction members, such as chains.

A further object of the invention is to provide said bars with exceedingly simple and efficient means for coupling the traction members to and whereby they can be readily detached from the clamping bars and whereby slackness of the traction members beyond that desirable for traction purposes can be reduced to the minimum.

A further object of the invention is to provide improvements in such clamping bars to prevent outward flexing or bending of the ends of such bars, and whereby the end portions of the bars to which the traction members are coupled will seat and abut against the wheel felly and be directly sustained and supported thereby.

A further object of the invention is to provide such clamping bars to seat against the wheel felly and receive the chain ends, with the inner bar so formed and offset as to throw the heads of the clamping bolts out of the way of brake drums or other parts at the inner side of the wheel.

With these and other objects in view, the invention consists in certain novel features in construction and in combinations and arrangements as more fully and particularly set forth and specified hereinafter.

Referring to the accompanying drawings:—

Fig. 4, shows the wheel rim and tire at the bottom of the wheel, in cross section and the anti-skid device applied thereto in end view or elevation.

Fig. 5, is a view similar to Fig. 4, but showing the approximate position of the chain when the anti-skid device is in reversed position at the top of the wheel.

Fig. 6, is a side elevation of one of the inner clamping bars.

Figure 1:
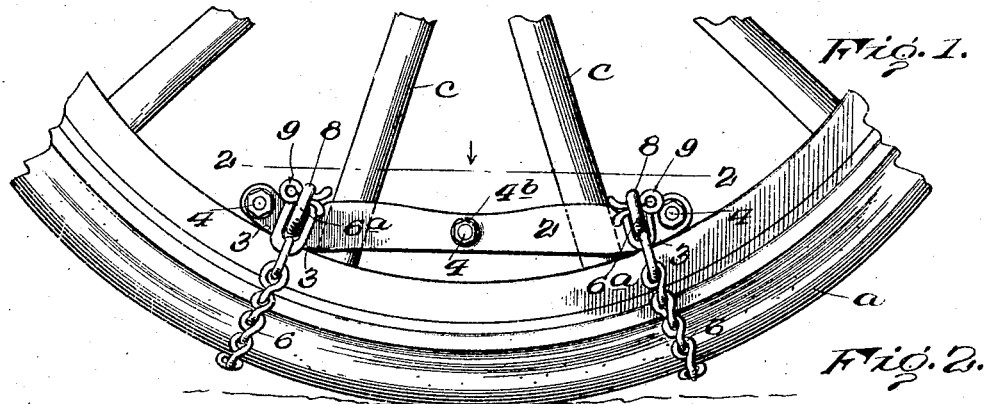
Fig. 1, shows a portion of a vehicle wheel in side elevation showing an anti-skid device in accordance with my invention applied thereto.

In the drawings, I show a portion of a truck wheel having tire $a$, felly $b$, and spokes $c$, although I do not wish to limit the application of my invention to truck wheels notwithstanding the fact that so-called anti-skid devices of this general type are usually termed "truck chains".

The device of my invention comprises a pair of clamping bars, approximately similar as to length. The length of these bars is such as to enable them to traverse two adjacent wheel spokes and project in opposite directions beyond both spokes. The bars fit the opposite side faces or edges of the spokes and are clamped rigidly against the spokes by cross bolts connecting the bars and located between wheel spokes.

One bar 1 is provided for the inner side of the wheel and a complementary bar 2 for the outer side of the wheel. The bars are usually flat to present comparatively wide flat faces to the spoke sides, and are preferably straight to form chords of the inner circle of the felly, while the outer edge portions of the bar ends are longitudinally curved, beveled or inclined to form end shoes 3 adapted to fit and solidly or squarely abut and seat against the inner surface of the felly. These end shoes or felly abutting surfaces 3 of the clamping bars are located opposite spaces between the wheel spokes when the bars are clamped in proper position on the wheel spokes.

The bars are clamped rigidly in operative position on the spokes with their end shoes 3 firmly abutting the wheel felly, by cross bolts 4, preferably connecting the projecting ends of the bars and their central or intermediate portions, with the bolts arranged between the wheel spokes. I show the bars formed with transverse bolts holes 4ᵃ through both ends and through their central portions. The bolts are applied with their heads fitting the outer faces of the inner bar 1, so that the threaded ends of the bolts project beyond the outer side bar 2 to permit ready access to the nuts 4ᵇ at the outer side of the wheel.

The portions of the inner bar 1, through which the bolts holes pass, i. e. the ends and center of the bar, are offset or depressed inwardly, see 1ᵃ, to form depressed seats for the bolt heads so that said heads will be seated inwardly beyond or flush with the plane of the outer surface of such bar.

In some instances, it is not possible to apply anti-skid devices of this general clamping bar type, to certain wheels because projecting portions of the inner clamping bar or the projecting bolts interfere with portions of the brakes or other parts located close to the inner sides of such wheels. I am enabled to overcome this difficulty by providing my flat inner clamping bar without outward projections and formed to depress the bolt heads.

Figure 2:
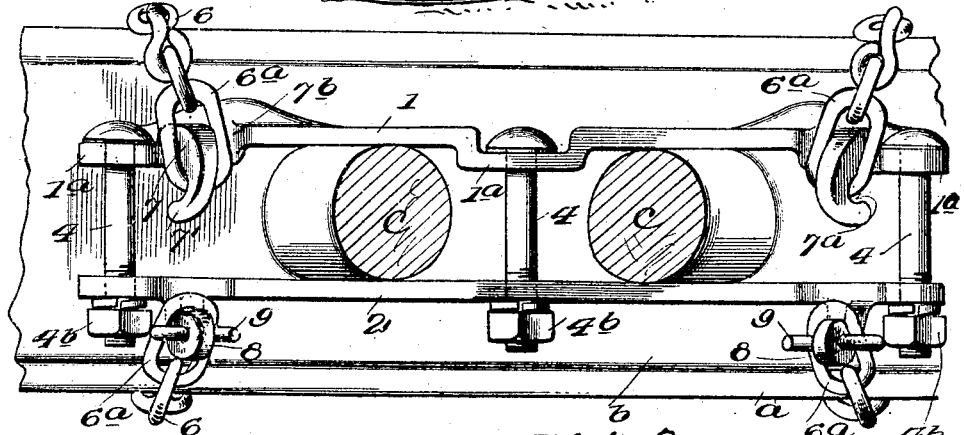
Fig. 2, is a section on the line 2—2, Fig. 1.
Figure 3:
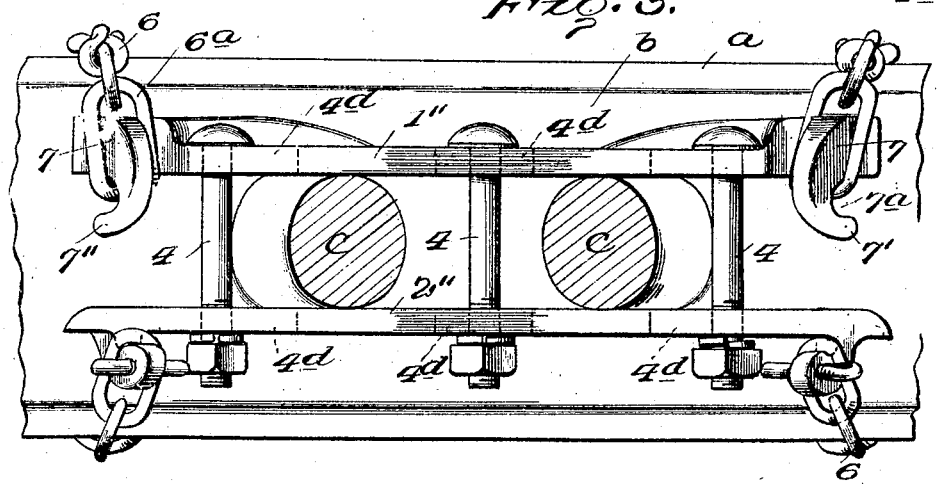
Fig. 3, is a view similar to Fig. 2, but illustrating clamping bars of different formation with the clamping bolts differently located.

However, I do not wish to limit all features of my invention to the special bar 1, formed as it is to solve a special problem, although this bar is adapted for general use. For instance, in Fig. 3, I show an inner bar 1″ which is not formed with the offset portions to receive the bolt heads. Also, the clamping bars 1″, 2″, have longitudinally elongated slots 4ᵈ to receive the clamping bolts and permit adjustment of the bolts longitudinally of said bars to accommodate different spoke spacing in different wheels. Also, the end bolt slots while located in the portions of the clamping bars that project beyond the two spokes against which the bars are clamped, are not located in projecting end extremities of said bars as in the form of Figs. 1 and 2, but somewhat nearer the adjacent spokes and between the same and the chain attaching devices.

In the particular examples illustrated, the loose traction members are formed by lengths of chain 6, although I do not wish to limit myself to chain of the particular structure or type shown and I herein employ the term "chain" in a generic sense to include equivalent loose traction means having flat end links 6ᵃ or the like, for attachment to the clamping bars.

The projecting ends of the inner clamping bar 1 or 1″ are provided with similar means for anchoring or coupling chain ends thereto. The projecting ends of the outer clamping bar 2 or 2″ are provided with means for anchoring or coupling the other ends of the chains and these means of the outer bar are similar to each other, but different from the anchoring means of the inner bar. Each anchoring means of the inner bar consists of a heavy strong U shaped horn or hook arranged in a plane transverse to the length of the bar and integral with the bar, and rising from the radially inner edge of the projecting bar end and curving radially inwardly, transversely, and radially outwardly so as not to project beyond the plane of the outer side face of the bar and thereby avoiding possible interference with brake or other parts that might be arranged close to the wheel as hereinbefore explained. The base or shank 7 of the hook is preferably rectangular or oblong in cross section to pass through the opening of the flat link 6ᵃ at the inner end (with respect to the wheel sides) of the chain. The free-end hook bill 7′ projects toward the radially inner surface of the wheel felly to form the hook or horn of approximately U-shape. The free end of the hook bill is spaced a sufficient distance from the adjacent surface of the wheel felly to permit the passage of the radially inner end of the link 6ᵃ, when held in a vertical position, and thus permit application of said link to and its removal from the hook. The length of the hook bill and the width of the approximately semi-circular socket 7ᵃ formed by the hook, are such with respect to the length of the link 6ᵃ with the next link therein as to prevent inward longitudinal movement of the link past the extremity of the hook bill, except when said link is held in a vertical position (with reference to Figs. 4, 5). The radially inner edge of the bar end at each side of the base or shank of the hook is formed to provide seats or sockets 7ᵇ to receive the side bars of the link 6ᵃ.

The corresponding ends of the outer bar 2 or 2″, are formed integral with free-end usually somewhat outwardly-offset lugs, posts, or ears 8, to enter the flat links 6ᵃ at the outer ends of the chains 6. These lugs are arranged at the outer side of the bar and project laterally and radially-inwardly therefrom and at their outer ends have transverse perforations to detachably receive any suitable means to confine the chain links against accidental detachment from the lugs, although in the drawings I happen to show removable cotter pins 9 for this purpose.

After the desired number of pairs of clamping bars have been applied to the wheel and secured as hereinbefore described, any suitable number of chains 6, as required by road conditions, can be passed over the tire and coupled to the wheel through the medium of clamping bars. In applying a chain, one end link 6ᵃ, (while the chain is slack and free) is held in a position radial or perpendicular with respect to the inner surface of the felly and its inner end is slipped under a horn or hook bill 7' and the link is then moved outwardly until the hook passes through the link. The chain is then passed around the tire and a flat link 6ª at its free end, is then placed on the lug 8 that is opposite the hook passing through the opposite end link of the chain. The cotter pin 9 or other locking device is then passed through the free end of the lug above or inwardly of the link thereon. The link 6ª on the lug extends downwardly and outwardly therefrom at an inclination and rests on the base of the lug and on the top edge of its bar when the parts are in the positions shown by Fig. 4. When the chain is thus passed or stretched around the tire, the link 6ª thereof that is on the hook is pulled radially outwardly to approximately the position shown by Fig. 4, resting and fulcruming on the radially inner edge of the clamping bar with the inner end of the link bearing radially inwardly against the heavy portion or shank of the hook. It is desirable that each applied chain have a limited amount of slack for traction purposes, but any greater amount of slack is disadvantageous. With the chain attaching means of my invention excess slack necessary for attachment and detachment of the chain is reduced to the minimum. In fact, in practice, only about one half inch excess slack is necessary to permit application of the chain to and from the lug 8, and there is no danger of the chains becoming accidentally detached from the lugs and hooks. When during the rotation of the wheel, the chains are at the top of the wheel, the cotter pins retain their links on the lugs, and the links on the hooks will drop slightly from the bar sockets 7ᵇ and the inner ends of the links will drop into the hook sockets 7ª without possibility of dropping from the hooks. However, some of the most important advantages of the chain coupling feature are the extreme strength, durability, and simplicity thereof and the ease and quickness of chain application and removal.

Another very important feature of the invention resides in the fact that the clamping bars are seated against the wheel felly directly under the points of application of the chains to such bars so that the stresses and strains of the chains on the bars when in action are transmitted directly to and are sustained by the felly. It will, in this connection, be noted that the shoes 3 of the bars, the inner inclined edges of the bar ends that bear against the felly, are located under the chain attaching hooks and lugs carried by said bar ends, and hence are in the line of pull of the chains on said lugs and hooks so that these bar ends are directly sustained by the felly. Furthermore, tendency of the clamping bar ends to spread or bow outwardly is overcome not only by such end seating of the bars on the felly but also by the provision of the clamping bolts between the projected ends of the bars. Clamping plates bolted together at their central portions only and having elevated projected ends have a tendency to spread at their ends and develop serious weakness and disadvantages.

It is evident that various changes, modifications and variations might be resorted to without departing from the spirit and scope of the invention and hence I do not wish to limit myself to the exact disclosures hereof.

What I claim is:—

1. An anti-skid device comprising a pair of clamping bars, one of said bars having integral traction chain attaching hooks extending radially inwardly from the radially inner edge of the bar and projecting laterally and turned radially outwardly, the other bar having chain attaching means, clamping means for said bars, and traction chains having end loops adapted to said hooks.

2. Means for securing anti-skid chains to a vehicle wheel, comprising an elongated bar constructed and formed to fit a side face of the wheel and at the opposite ends of its outer longitudinal edge portion having longitudinally diverging shoes formed to seat on the wheel felly, the opposite ends of the bar having integral chain attaching means.

3. Means for securing one end of an anti-skid chain to a vehicle wheel comprising an elongated bar having a hook extending at an angle thereto and radially toward the wheel axis, and means for clamping said bar to a lateral surface of the wheel with said hook extending laterally therefrom into the space between adjacent wheel spokes, said hook having a free end over which the length of the chain can be engaged, said free end projecting outwardly with respect to the wheel axis.

4. Means for securing one end of an anti-skid chain to the side face of a vehicle wheel, comprising a bar having a hook integral therewith and projecting from the inner edge of the bar toward the wheel axis with the free end of the hook projecting outwardly with respect to the wheel axis, said hook being arranged transversely with respect to the bar, and means for clamping said bar to a lateral surface of a wheel spoke with the transversely arranged hook projecting between adjacent spokes of the wheel.

5. Means for securing an anti-skid chain to a vehicle wheel, comprising an elongated bar provided with an integral U-shaped hook for receiving an end link of an anti-skid chain, said hook projecting from the inner longitudinal edge of the bar toward the wheel axis and extending laterally from the bar to project into the space between adjacent spokes of the wheel to which said bar is adapted.

6. Means for securing an anti-skid chain to a vehicle wheel, comprising an elongated straight bar having diverging shoes at its outer longitudinal end edges to seat against the wheel felly, the ends of said bar provided with chain attaching means integral therewith, and clamping bolts for the opposite bar ends and for an intermediate portion of the bar for clamping the bar to the lateral surface of a wheel with said ends held against springing laterally.

7. In combination with a wheel, means for securing an anti-skid chain thereto comprising a bar having a U-shaped hook extending transversely therefrom, and means for clamping said bar to a lateral surface of the wheel with said hook projecting into the space between adjacent spokes.

8. Means for securing anti-skid chains to a vehicle wheel comprising an elongated bar having bolt holes at its ends, and bolts adapted thereto for clamping the bar to the lateral surface of a vehicle wheel, said bar ends having hooks integral therewith and projecting laterally therefrom to enter the spaces between adjacent wheel spokes, said hooks having free ends projecting outwardly with respect to the wheel axis.

JOHN REICHERT.